United States Patent
Shea

[11] Patent Number: 5,286,392
[45] Date of Patent: Feb. 15, 1994

[54] LAUNDER WITH BAFFLE SYSTEM AND REGULATABLE AIR DISCHARGE STRUCTURE

[75] Inventor: Edward M. Shea, Salt Lake City, Utah

[73] Assignee: Baker Hughes Incorporated, Houston, Tex.

[21] Appl. No.: 21,160

[22] Filed: Feb. 22, 1993

Related U.S. Application Data

[63] Continuation-in-part of Ser. No. 841,828, Feb. 26, 1992, Pat. No. 5,227,077.

[51] Int. Cl.$^5$ .............................................. B01D 24/46
[52] U.S. Cl. .................................... 210/793; 210/269; 210/271; 210/275; 210/188; 210/86
[58] Field of Search ............... 210/793, 269, 271, 275, 210/188, 195.4, 274, 521, 534, 86; 55/185, 199

[56] References Cited

U.S. PATENT DOCUMENTS

| | | | |
|---|---|---|---|
| 2,595,602 | 5/1952 | Parks | 55/186 |
| 2,888,140 | 5/1959 | Herbert | 210/275 |
| 3,346,122 | 10/1967 | Cornelissen | 210/522 |
| 3,353,676 | 11/1967 | Hirsch . | |
| 3,563,389 | 2/1971 | Mizrahi et al. | 210/521 |
| 4,064,054 | 12/1977 | Anderson et al. | 210/536 |
| 4,076,625 | 2/1978 | Scholten et al. | 210/274 |
| 4,132,652 | 1/1979 | Anderson et al. | 210/536 |
| 4,191,652 | 3/1980 | Whitmore | 210/275 |
| 4,478,726 | 10/1984 | Moore | 210/793 |
| 4,743,382 | 5/1988 | Williamson et al. | 210/786 |
| 4,746,431 | 5/1988 | Gibaud et al. | 210/274 |
| 5,207,905 | 5/1993 | O'Brian et al. | 210/275 |
| 5,227,077 | 7/1993 | Shea | 210/793 |

FOREIGN PATENT DOCUMENTS 1581833 12/1980 United Kingdom .

Primary Examiner—Robert A. Dawson
Assistant Examiner—Ana M. Fortuna
Attorney, Agent, or Firm—Trask, Britt & Rossa

[57] ABSTRACT

A launder and baffle structure, used in association with a filtration tank of the type using granular filtration media, is disclosed which reduces the amount of filtration media lost during a backwashing cycle. The structure of the invention includes an elongated launder, baffle structure system associated with the elongated launder and regulatable air discharge structure associated with the baffle structure system. The structure of the invention is configured to reduce velocity of flow in order to provide settling of filter media from solution and is configured to provide dissipation of air from solution to further enhance quiescence of flow and settling of filter media from solution. The regulatable air discharge system is adjustable to release a selected amount of air from beneath the baffle system in order to regulate turbulence and thereby facilitate quiescence of flow.

8 Claims, 2 Drawing Sheets

LAUNDER WITH BAFFLE SYSTEM AND REGULATABLE AIR DISCHARGE STRUCTURE

BACKGROUND

Related Application

This application is a continuation-in-part of co-pending application Ser. No. 841,828 filed Feb. 26, 1992 now U.S. Pat. No. 5,227,077, the contents of which are incorporated herein by reference.

Field of the Invention

This invention relates to filtration systems which use filter media to remove materials in solution, and which include backwash systems and launders. Specifically, this invention relates to baffle systems associated with a launder structured to produce quiescence in fluid flow and removal of air to enhance settling of filter media from solution thereby reducing loss of media during backwashing.

State of the Art

Filtration systems which use granular filter media, such as sand or gravel, to remove solids or particulates suspended in fluid are well-known in the art. Such systems are often used in wastewater, clean-water and oil/water separation systems. Filter media filtration systems typically include a tank having drainage apparatus in the bottom of the tank for discharging filtered fluid therethrough, and granular media layered on top of the drainage apparatus.

In conventional operation, fluid to be filtered is introduced into the tank, and downward movement of the fluid through the granular media causes solids and particulate matter to accumulate in the media. The filtered fluid drains to the bottom and exits the tank through the drainage apparatus. After hours of operation, the solids and particulates which have accumulated in the granular media reduce the efficacy of the filtration system and must be cleaned.

The drainage apparatus at the bottom of the tank is typically configured to provide backwashing or reverse filtration in which water and air are flushed back through the drainage apparatus and upwardly through the filter media to remove the accumulated solids and particulates. Launders, also referred to as troughs, are positioned in the upper portion of the tank, above the filter media. As water entering from the drainage apparatus fills the tank, the backwash spills over into the launders and is carried away from the tank.

It is known that forcing water and air through the filter media during backwashing is the most efficient means of removing accumulated solids and particulates. However, turbulence from the air causes lighter filtration media to be dislodged from the bed, and it is eventually discharged into the launder with the backwash. A considerable loss of filter media can result.

Others in the field have designed backwashing systems to reduce the amount of media lost during backwash. Examples of various systems are disclosed in U.S. Pat. No. 3,353,676 to Hirsch, issued Nov. 21, 1967; U.S. Pat. No. 4,076,625 to Scholten et al., issued Feb. 28, 1978; U.S. Pat. No. 4,132,652 to Anderson et al., issued Jan. 2, 1979; and, U.S. Pat. No. 4,746,431 to Gibaud et al., issued May 24, 1988.

Baffle systems have been developed which deflect and direct fluid flow in the area of the launder. U.S. Pat. No. 4,076,625 discloses a system in which curved baffles are positioned on either side of a launder to provide restricted channels on either side of the launder thereby directing the upward flow of fluid in a manner to allow media to fall back into the tank. By restricting flow around the launder, the flow velocity is reduced below the settling velocity of the media and media settles back into the tank.

Most launder and baffle systems address only reduction of flow velocity as a means of promoting settlement of the media, and do not address direction of flow or the disposition of air in suspension as a means of further reducing turbulence and thereby enhancing settling of the media. Prior systems have not recognized the advantages to be gained from regulating air discharge from the baffle system as a means of selectively enhancing quiescent flow.

Additionally, prior systems have not been structured to provide removal of the clogging particulates which float on the surface of the backwash fluid as a result of being dislodged from the media bed. Rather, as illustrated in U.S. Pat. No. 4,076,625, baffle systems have been designed to extend above the launder thereby preventing floating particulates from being removed by the launder.

Therefore, it would be an advancement in the field to provide structure associated with a launder which reduces flow velocity, which directs flow away from the launder, which provides dissipation of air from the fluid to promote more efficient settling of filtration media therefrom and which regulates discharge of the air to enhance flow quiescence and settling. Further, it would be advantageous to provide baffle structure which facilitates removal of floating particulates from the backwash fluid to eliminate return of such clogging materials to the filter bed.

SUMMARY OF THE INVENTION

In accordance with the present invention, a launder is provided with a system of baffles positioned laterally thereto and aligned therewith to promote quiescence of fluid flow circulating about the launder to thereby facilitate settling of granulated filtration media from the fluid, the launder further being provided with adjustable air-discharge structure in fluid communication with the baffle system to provide regulatable discharge of air from beneath the baffle system to facilitate quiescence and settling of filtration media out of the fluid. The baffle system is associated with the launder in a manner to facilitate removal of floating particulates from the fluid and deposit of such particulates into the launder. While the structure of the present invention is applicable to various filtration systems generally, this disclosure focusses on use of the invention with wastewater filtration systems as an example.

The launder of the invention is a trough-like structure positioned above the granulated filtration media in a filtration tank and generally comprises a bottom and sides projecting upwardly from the bottom. The bottom of the launder is shaped to maximize quiescence of fluid flow beneath the launder. Most suitably, the bottom of the launder is rounded, however, the bottom of the launder may take any other appropriate shape, such as squared or triangulate. Backwash fluid entering the launder is carried away from the launder by effluent pipes associated with the launder.

Associated with the launder is a system of baffles which direct fluid flow around the launder to promote quiescent flow and thereby facilitate settling of media from the fluid. Certain baffles of the system are structured to promote release of air from the fluid. The baffle system further includes adjustable discharge means for regulating the amount of air beneath the baffles to further facilitate quiescent flow.

The baffle system also includes a number of baffles positioned parallel to the sides of the launder to particularly direct fluid thereabout and enhance release of granulated media from the fluid. Although a single such parallel baffle may be included in the baffle system, the settling of media from the fluid increases with additional numbers of parallel baffles. The baffles which are positioned parallel to and along the sides of the launder are aligned with the top of the launder to allow floating particles backwashed from the filtration media to be removed via the launder.

Support structure maintains the baffle system in position relative to the launder. Although baffles may be associated with only one side of the launder, preferably baffles are positioned on both sides of the launder to maximize settling of media back to the tank.

In operation, fluid rising from the tank during backwashing impacts against the bottom surface of the launder and is directed against and below certain of the baffles. Fluid circulating beneath those baffles is reduced in flow velocity resulting in settling out of air and some filter media. Fluid circulates beneath those baffles and is eventually directed away therefrom. Released air forms a pocket beneath those baffles and produces a higher or lower level of fluid beneath the baffle. If too much air develops beneath those baffles, the air becomes turbulent and air and fluid may bubble from beneath the baffle exacerbating the turbulence. If the amount of air is too low, and thus the fluid level is too high, fluid and media will bubble from the air discharge structure. Therefore, the amount of air discharged from beneath the baffles, and thus the level of fluid beneath the baffle, can be regulated by adjustable discharge means to reduce turbulence and promote quiescence in the fluid.

Fluid exiting from below the baffles flows upwardly and impacts against other baffles positioned parallel to the launder and flow velocity is reduced further while settling is enhanced. Fluid substantially free of filter media flows over the upper surface of the launder to enter into the launder. Granulated media which settles from the fluid descends toward the tank until it re-enters the flow path circulating beneath the baffle system structure. Once backwashing ceases by discontinuation of air flow, the media settles into the tank to resume a buoyant state therein. The present structure also allows floating particulates, also referred to herein as "floatables," to flow into the launder rather than to be returned to the filtration media of the tank.

BRIEF DESCRIPTION OF THE ILLUSTRATED EMBODIMENT

In the drawings, which illustrates what is currently regarded as the best mode for carrying out the invention, FIG. 1 is a perspective view of a launder having associated therewith a baffle system and air-discharge regulation structure, the launder being formed into the walls of a tank;

DETAILED DESCRIPTION OF THE ILLUSTRATED EMBODIMENT

Figure 1:
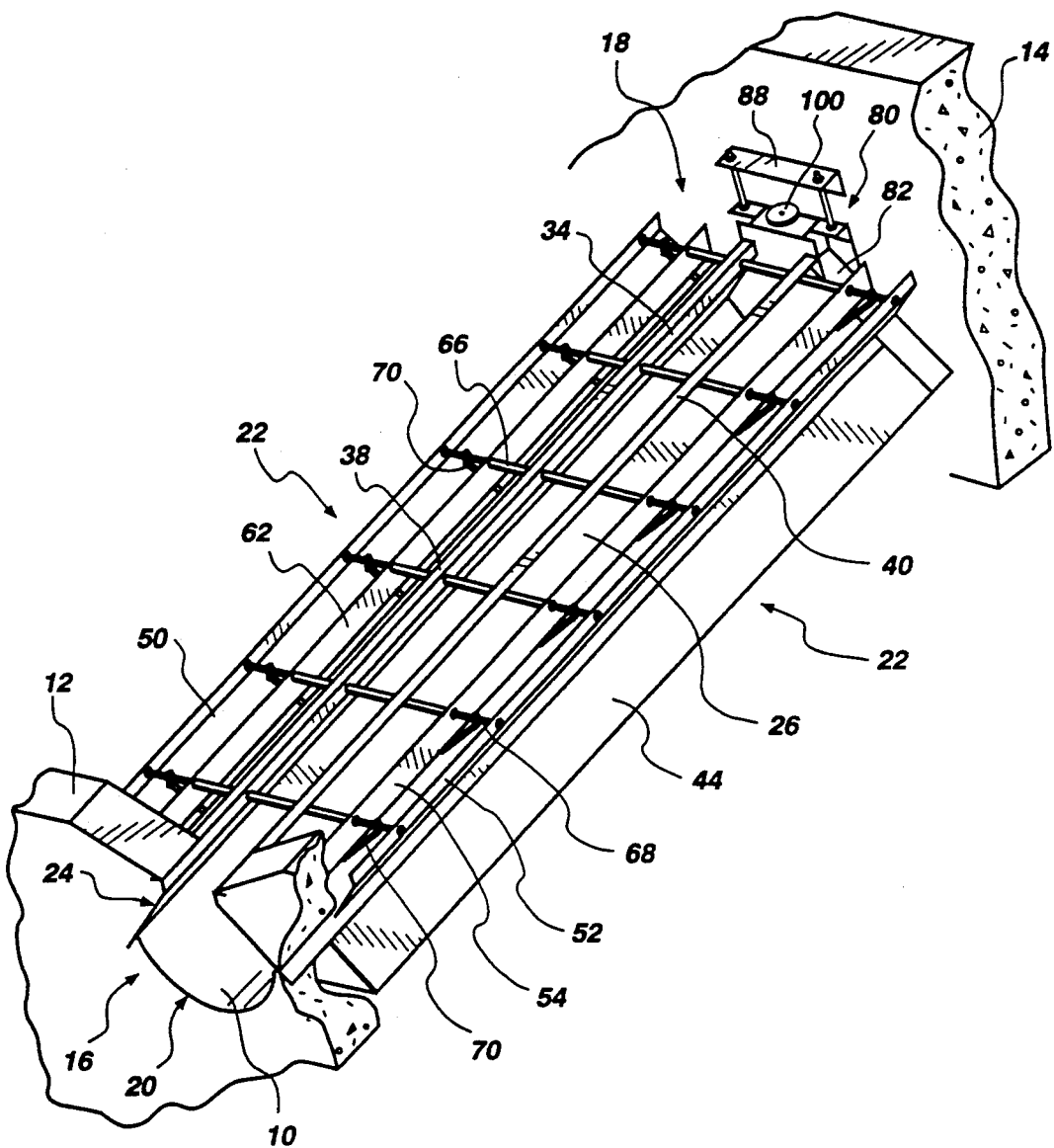

As shown in FIG. 1, the launder 10 of the invention is connected to the walls 12, 14 of a filtration tank in some manner, such as by embedment in the walls 12, 14. The tank (not shown completely) is filled with granulated filtration media (not shown), and the launder 10 is positioned thereabove. The launder 10 is a trough-like structure having first and second ends 16, 18 attached to the filtration tank and a rounded bottom 20. The bottom 20 of the launder 10 may, alternatively, have another configuration such as squared or triangulate.

Figure 2:
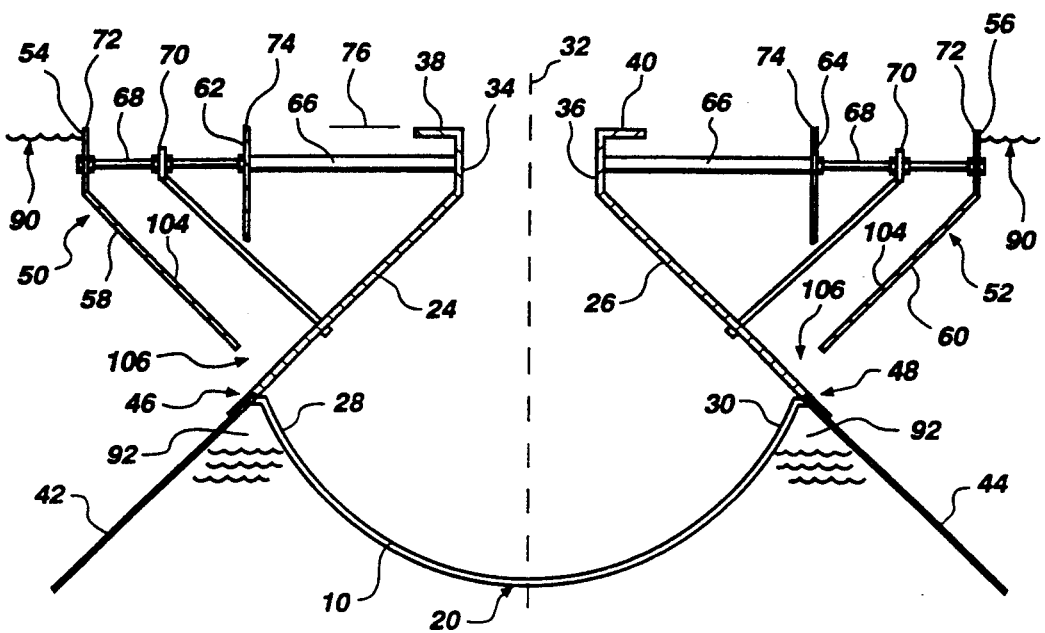
FIG. 2 is a sectional view of the launder and baffle system shown in FIG. 1 taken through line 2—2.

A system of baffles 22 is connected to the launder 10 and comprises a number of baffles oriented in varying positions relative to the launder 10. Referring to FIGS. 1 and 2, upward sloping baffles 24, 26 extend from the sides 28, 30 of the launder 10 and slope inwardly toward the center line 32 of the launder 10. The upward sloping baffles 24, 26 are structured with a vertical wall portion 34, 36 at the upper end thereof, and are further structured with a horizontal lip 38, 40 extending perpendicularly from the vertical wall portion 34, 36.

Extending downwardly from the sides 28, 30 of the launder 10 are lower sloping baffles 42, 44 which angle away from the center line 32 of the launder 10. A continuous surface 46, 48 is formed by alignment of the upper sloping baffles 24, 26 with the lower sloping baffles 42, 44. Although the continuous surface 46, 48 shown in FIG. 2 is linear as a result of the upper sloping baffles 24, 26 and the lower sloping baffles 42, 44 being complementarily angled, the angles of the baffles may vary resulting in a non-linear continuous surface.

Wing baffles 50, 52 are positioned above the lower sloping baffles 42, 44 and lateral to the upper sloping baffles 24, 26. The wing baffles 50, 52 comprise a vertical wall portion 54, 56 and a sloping embankment 58, 60 extending from the vertical wall portion 54, 56. The sloping embankment 58, 60 of the wing baffles 50, 52 extends toward the upper sloping baffles 24, 26 and are positioned at approximately a right angle thereto. The angle between the sloping embankment 58, 60 and the upper sloping baffle 24, 26 may be, however, a more acute angle.

Vertical baffles 62, 64 are positioned lateral to the launder 10 and are positioned between the upper sloping baffles 24, 26 and the wing baffles 50, 52. A single vertical baffle 62, 64 is shown in FIGS. 1 and 2 on either side of the launder 10. However, a plurality of vertical baffles may be positioned between the upper sloping baffles 24, 26 and the wing baffles 50, 52. The amount of granulated media that can be removed from the backwash fluid increases with additional numbers of vertical baffles.

The wing baffles 50, 52 and vertical baffles 62, 64 are secured in position relative to the launder 10 and the upper sloping baffles 24, 26 by support structures. The support structures may comprise horizontally extending pins 66, 68 secured to the vertical wall portion 34, 36 of the upper sloping baffle 24, 26 and struts 70 also secured to the upper sloping baffles 24, 26. Notably, the upper end 72 of the wing baffles 50, 52, the upper end 74 of the vertical baffles 52, 64 and the horizontal lip 38, 40 of the upper sloping baffles 24, 26 are all aligned along a generally horizontal plane 76.

Figure 3:
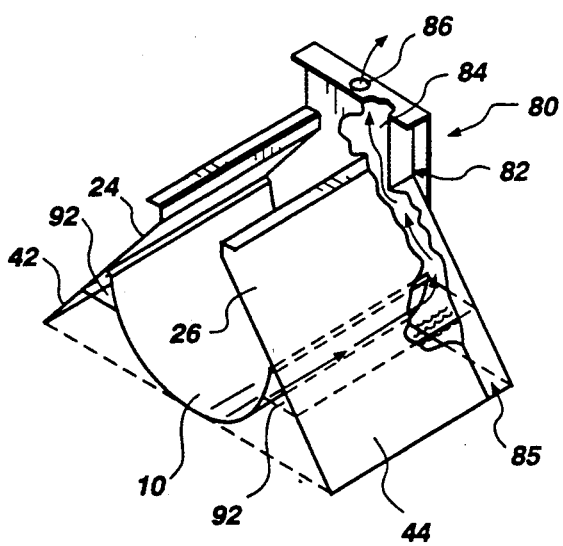
FIG. 3 is a perspective view in partial cutaway of the air-discharge structure of the invention.
Figure 4:
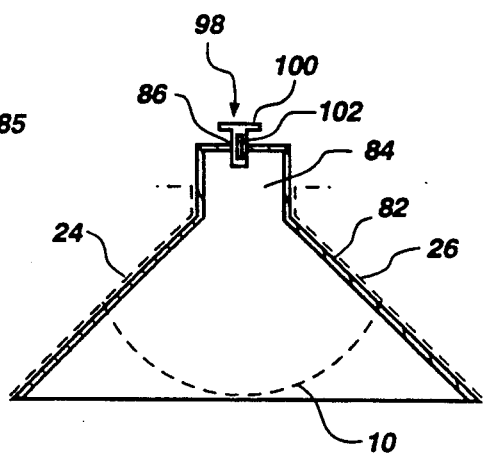
FIG. 4 is a sectional view of the air-discharge structure.

Air discharge structure 80 is connected to the launder 10 and is in fluid communication with the lower sloping baffles 42, 44 as may be seen more clearly in FIGS. 3 and 4. The air discharge structure 80 generally includes a housing 82 having a chamber 84 formed therein into which air released from solution may enter, an open bottom 85 and a regulatable aperture 86 through which air may escape the housing 82, as explained further below. FIG. 1 illustrates an air discharge structure 80 being positioned at the end of the launder 10 flush with the wall 14 of the tank. The air discharge structure 80 is supported against the wall 14 by support bracket 88. Air discharge structures 80 may be located at one end of the launder as shown in FIG. 1, or may be located at both ends of the launder 10. Air discharge structures may also be located along the length of the launder 10.

In operation, water and air are flushed through the filtration bed from below the bed and the upwardly moving water and air dislodge particulate matter from the interstitia of the granulated media. As a result, some of the granulated material on top of the bed is flushed away from the bed and is urged upwardly. Water, containing granulated media, particulates and air, eventually fills the tank to the top of the launder 10 and baffle system 22 and a water line is established at 90, as shown in FIG. 2. Water contacts the bottom 20 of the launder 10 and flows outwardly beneath the lower sloping baffles 42, 44. Contact with the rounded bottom 20 of the launder 10 and with the lower sloping baffles 42, 44 causes a reduction in flow velocity of the fluid. With reduced flow velocity, media settles out of solution and returns to the flow path in the tank below the baffle system.

Additionally, with reduced flow velocity, air comes out of solution in the water and a pocket of air 92 forms in the area just below the junction between the lower sloping baffles 42, 44 and the launder 10. Air circulates along the length of the lower sloping baffles 42, 44 and enters into the chamber 84 of the air discharge housing 82. As illustrated in FIG. 3, air moves from beneath the lower sloping baffles 42, 44 and into the chamber 84 whereafter the air is discharged through aperture 86.

The amount of air discharged through aperture 86 is regulatable by regulation means 98. For example, as shown in FIG. 4, the regulation means 98 may be an adjustable plug 100 slidably positionable through aperture 86, the plug 100 having fenestrations 102 formed therein through which air may move. With regulation of the amount of air which may be discharged from beneath the lower sloping baffles 42, 44 the amount of fluid turbulence existing below the lower sloping baffles 42, 44 can be regulated.

More specifically, an optimal level of fluid is preferably maintained beneath the lower sloping baffles 42, 44 since a high fluid level will cause fluid and media to bubble out of the air discharge housing 82 and a low fluid level will cause fluid to bubble from beneath the lower sloping baffles 42, 44. In either instance, fluid turbulence results and media is less effectively removed from solution. A proper level of fluid established beneath the lower sloping baffles provides an air cushion against which water may flow. The removal of air from beneath the lower sloping baffles 42, 44, and thus the maintenance of a particular fluid level below the baffles 42, 44, reduces turbulence and thereby facilitates flow velocity reduction. What fluid level is optimal is dependent on many factors including the shape of the launder, the degree of slope of the lower sloping baffles 42, 44 and fluid conditions.

The regulation means 98 may be manually adjustable as suggested by FIG. 4 when a systems operator perceives that a high level of turbulence is occurring beneath the lower sloping baffles 42, 44. Alternatively, the regulation means 98 may be automatically adjustable by association therewith of detection means capable of detecting certain conditions, such as water level or pressure. The detection means thus dictates adjustment of the regulation means 98.

Fluid flows from beneath the lower sloping baffles 42, 44 and moves upwardly. Fluid then flows over the upper end 72 of wing baffles 50, 52. Encounter with the wing baffles 50, 52 further reduces flow velocity so that more granulated media is released from the fluid. The media is directed downwardly over the inner surface 104 of the sloping embankment 58, 60 of the wing baffles 50, 52 and exits through space 106 formed between the wing baffles 50, 52 and the upper sloping baffles 24, 26.

As fluid moves toward the launder 10 it encounters vertical baffles 62, 64 which further reduce flow velocity, and again media is released from the fluid. While residual air and media are released from solution as a result of the fluid moving across the various baffles, particulate matter which is dislodged from the filtration bed floats to the top 90 of the fluid in the tank. Because the upper ends 72 of the wing baffles 50, 52 and vertical baffles 62, 64, respectively, are aligned with the horizontal lip 38, 40 of the upper sloping baffles 24, 26, the "floatables" are allowed to exit into the launder 10 without falling back into the fluid where they may become lodged in the filtration bed again. An outlet conduit (not shown) associated with the launder 10 receives fluid and floatables from the launder 10.

The present invention provides baffle structure in association with a launder which reduces flow velocity of fluid circulating in a tank to promote release of media therefrom, and also provides structure to utilize the regulatable release of air from the baffle system to enhance reduction of flow velocity. The invention is structured to be retrofittable to any existing treatment apparatus which employs a launder. The invention may be used in wastewater treatment tanks having backwashing structure as described above, but may also be used in other applications, such as treatment of mine effluent. Reference herein to specific details of the illustrated embodiment is by way of example and not by way of limitation. It will be apparent to those skilled in the art that many modifications of the basic illustrated embodiment may be made without departing from the spirit and scope of the invention as recited by the claims.

What is claimed is:

1. Structure for reducing media loss during backwashing in a filtration system of the type using granular filter media, comprising:

an elongated launder having a bottom surface, spaced apart sides, and an open top;

first baffle structure connected to said launder and extending downwardly and outwardly therefrom to provide a space therebetween, said space providing a course for movement of fluid;

second baffle structure connected to and extending above said launder;

third baffle structure positioned laterally to said launder and connected thereto, said third baffle structure having a sloping embankment oriented at an angle to said second baffle structure;

vertical baffle structure positioned between said third baffle structure and said launder; and regulatable air discharge structure in fluid communication with said space formed between said first baffle structure and said launder.

2. The structure of claim 1 wherein said air discharge structure includes a chamber and an aperture formed in said chamber through which air escapes, said aperture having regulation means for selectively regulating the amount of air discharged from said chamber.

3. The structure of claim 2 wherein said regulation means is automatically regulatable.

4. The structure of claim 2 wherein said vertical baffle structure is a plurality of vertical baffles.

5. The structure of claim 1 wherein said second baffle structure, said third baffle structure and said vertical baffle structure each have an upper end, said upper ends of each said baffle being aligned in a horizontal plane.

6. A method of reducing loss of media during a backwashing cycle in a filtration tank using granular filtration media comprising:

providing in a filtration tank structure comprising:

an elongated launder having a bottom and spaced apart sides;

baffle structure connected to said launder and configured to reduce flow velocity, said baffle structure further being structured to provide a space for communication of air released from fluid circulating around said baffle structure;

regulatable air discharge structure associated with said baffle structure and in fluid communication therewith to selectively release air trapped beneath said baffle structure;

operating said filtration tank in a backwashing cycle by flushing fluid and air through said granular filtration media;

directing said fluid toward said bottom of said launder to urge said fluid toward said baffle structure to dissipate the velocity of said fluid, to dissipate air from said fluid and to direct said fluid away from said launder; and adjusting said regulatable air discharge structure to selectively discharge air therefrom thereby establishing a selected fluid level relative to said baffle structure.

7. The method according to claim 6 wherein said baffle structure further comprises:

first baffle structure connected to said launder and extending downwardly and outwardly therefrom to provide a space therebetween, said space providing a course for movement of fluid;

second baffle structure connected to and extending above said launder;

third baffle structure positioned laterally to said launder and connected thereto, said third baffle structure having a sloping embankment oriented at an angle to said second baffle structure; and vertical baffle structure positioned between said third baffle structure and said launder.

8. The method according to claim 7 wherein said regulatable air discharge structure includes a housing having a chamber formed therein and an aperture, said aperture having regulation means associated therewith for selectively releasing air therethrough.

* * * * *